BRUSHLESS AXIAL AIRGAP INDUCTOR-TYPE DYNAMOELECTRIC MACHINES AND SYNCHRO SYSTEMS USING THE SAME

Filed Dec. 11, 1967 5 Sheets-Sheet 1

INVENTOR
WILLIAM GEORGE BIRD
BY Young & Thompson
ATTORNEYS

INVENTOR
WILLIAM GEORGE BIRD
BY
Young & Thompson
ATTORNEYS

INVENTOR
WILLIAM GEORGE BIRD
BY
Young & Thompson
ATTORNEYS

BRUSHLESS AXIAL AIRGAP INDUCTOR-TYPE DYNAMOELECTRIC MACHINES AND SYNCHRO SYSTEMS USING THE SAME

Filed Dec. 11, 1967

INVENTOR
WILLIAM GEORGE BIRD
BY
Young & Thompson
ATTORNEYS

INVENTOR
WILLIAM GEORGE BIRD
BY Young & Thompson
ATTORNEYS

United States Patent Office
3,467,844
Patented Sept. 16, 1969

3,467,844
BRUSHLESS AXIAL AIRGAP INDUCTOR-TYPE DYNAMOELECTRIC MACHINES AND SYNCHRO SYSTEMS USING THE SAME

William George Bird, 11 Cranbrook Road, Redland, Bristol 6, England

Filed Dec. 11, 1967, Ser. No. 689,414
Claims priority, application Great Britain, Dec. 14, 1966, 55,960
Int. Cl. H02k *17/42, 19/20, 19/24*
U.S. Cl. 310—168 14 Claims

ABSTRACT OF THE DISCLOSURE

Brushless axial airgap inductor-type dynamoelectric machines using plural variable reluctance rotors and a toroidal coil stator therebetween. Each rotor and stator may comprise a pair of concentric rotor and stator members. The stationary field coils may be replaced with a permanent magnet. The machines may be single or polyphase generators with rectifiers for D.C. if desired. The machines may be employed as synchronous motors and as resolvers or synchros. The magnetic portions of the rotors may be shaped to produce a desired wave shape as a sine or square wave.

Figure 1:
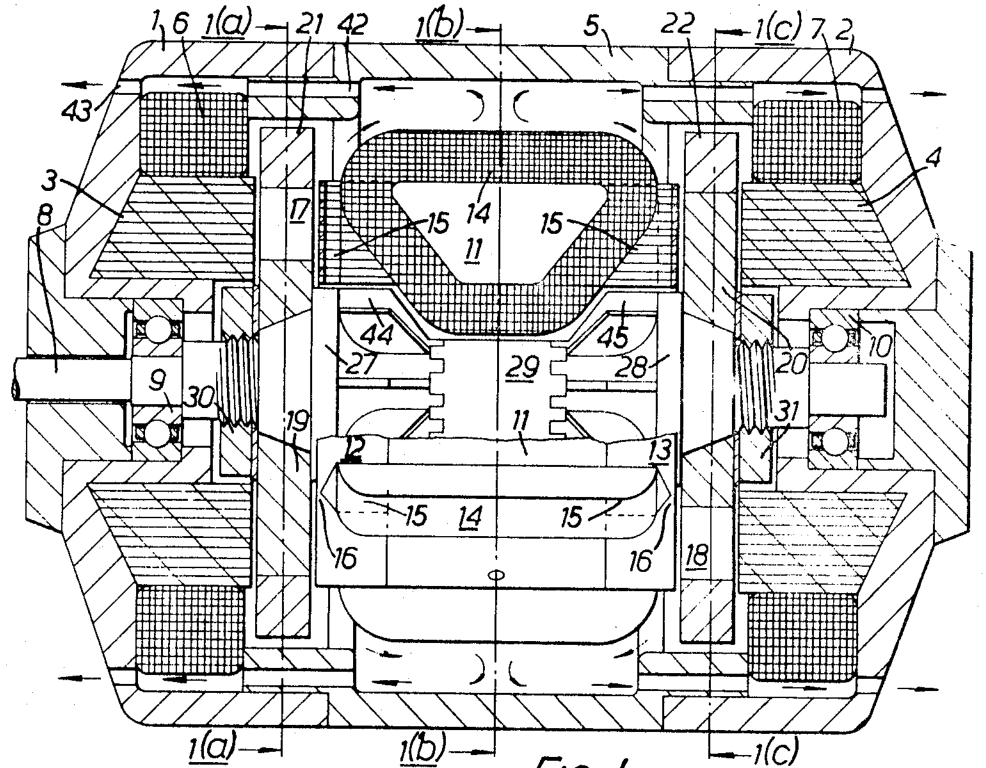
Figure 1A:
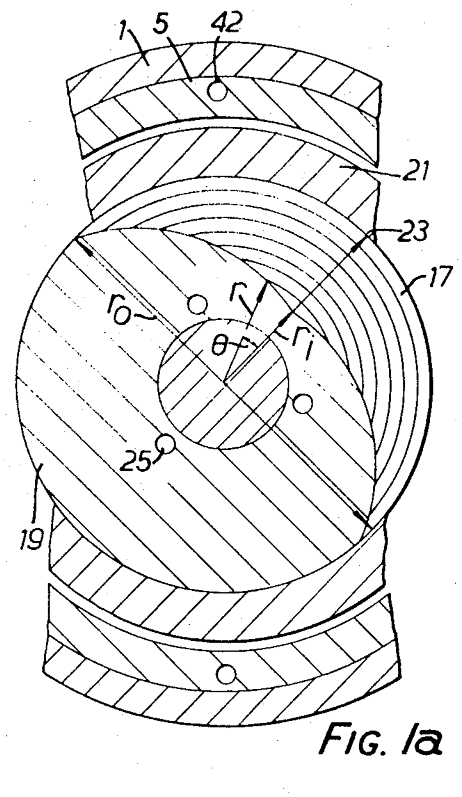

This invention relates to electrical machines and is particularly though not exclusively applicable to A.C. and D.C. generators of the inductor type in which there are no slip rings or commutators, all coils being mounted on the stator, and the rotor is for the most part constructed of magnetic material so shaped that a magnetic field developed therein either by fixed exciting coils or by a permanent magnet is caused, upon rotation of the rotor, to generate an alternating E.M.F. in fixed output coils, this E.M.F. causing alternating currents to flow in an external circuit which may include stationary rectifiers to cause a direct current to flow in the external circuit.

The invention also relates to A.C. synchronous motors of a type generally similar to the A.C. generator described in the previous paragraph, but in which the fixed output coils thereof are replaced by fixed input coils to which a multiphase A.C. is applied in such a way as to produce a rotating magnetic field which, on interaction with a unidirectional magnetic field developed by the fixed exciting coils or by a permanent magnet, produces rotation of the rotor at a speed synchronous with that of the rotating magnetic field.

The invention further relates to electromechanical devices, used in data transmission systems and electrical followup apparatus, of the general type known as synchros or sometimes under the registered trade name of "Selsyns," which devices are used commonly in conjunction with one or more similar devices to derive a visual indication of (or an electrical signal dependent on) the relative displacement of the shafts or bodies to which they are attached, or to develop a torque tending to reduce such displacement to a minimum. The invention may also be adapted to produce another form or synchro commonly known as a resolver in which voltages proportional to the sine and cosine of the angular displacement of a shaft may be generated, or it may be adapted to produce a linear synchro in which voltages proportional to the angular displacement of the shaft over a certain range may be generated.

It is well known that in certain applications of electrical A.C. and D.C. generators, notably in aircraft and other forms of transport in which it is necessary that both the weight and size of the said generators for a given power output should be as small as possible, it is desirable to design them so that they may be operated at a high temperature and so that their rotors may be run at high speeds. It is also desirable to obviate the use of commutators or slip rings, partly on account of maintenance difficulties, but in aircraft principally on account of the well-established fact that the brushes associated therewith tend to disintegrate very rapidly when the ambient atmosphere has a pressure, temperature and, in particular, humidity which is greatly different from its normal value at ground level, as is the case at very high altitudes for example.

In efforts to comply with these desiderata brushless A.C. and D.C. generators have been developed and utilized in which a field-exciting D.C. winding on the stator develops multiphase A.C. voltages in coils wound on the rotor, which voltages are applied to static rectifiers of the semiconductor type and mounted on the rotor so as to produce a D.C. current which is in turn applied to main field coils wound on the rotor. In this way there is produced a rotating magnetic field adapted to generate multiphase A.C. voltages in suitable coils wound on the stator, which A.C. voltages serve as a source of multiphase A.C. supply or may, if desired, be rectified to produce a D.C. supply. Such generators suffer, however, from the disadvantage that the static rectifiers mounted on the rotor may be subjected to objectionable centrifugal forces at very high speeds and, in particular, the fact that the efficiency of suitable static rectifiers of the semiconductor type falls off seriously at high temperatures restricts undesirably the temperature at which the rotor might otherwise be operated.

Brushless A.C. and D.C. generators have also been developed and utilized which are of the inductor type as hereinbefore defined, but existing types also suffer from serious disadvantages. If, for example, they be either of the well-known homopolar type or alternatively of the well-known heteropolar type the magnetic circuit associated with the output coils is for the most part subjected to a pulsating magnetic field in one direction only, and not an alternating one, with the result that both the magnetic material of the stator and the output coils are inefficiently used and the generator tends in consequence to be unduly bulky and heavy for a given power output. If, on the other hand, an attempt be made to avoid this disability by designing the rotor so that, in effect, consecutive magnetic poles of opposite polarity in the circumferential direction are produced thereon then the resulting shape of the rotor tends to make it awkward and expensive to manufacture, difficult to balance dynamically so as to run satisfactorily at very high speeds, subject to low critical speeds of whirling, and productive of severe gyroscopic stresses at times when installed in a rapidly-moving body such as an aircraft. Furthermore, structural complication may arise in so shaping the magnetic pole pieces on the rotor, and locating the output coils in their slots on the stator, that the output AC waveform does not depart seriously from a desired sinusoidal form and have a number of unwanted harmonic components, whilst adequate cooling of the generator may also present difficulty.

Similar disadvantages exist in the case of AC. synchronous motors of the brushless inductor type, such as may be used in aircraft under circumstances where rigid synchronism of speed with the frequency of an A.C. supply is necessary and where greater power outputs are required than are practicable with hysteresis motors, phonic wheel motors, or the like.

It is one object of the present invention, therefore, to produce a brushless A.C. or D.C. generator, or A.C. synchronous motor, of the inductor type in which at least some of the aforesaid dsiadvantages are substantially overcome. Subsidiary or alternative objects are to provide a machine in which the magnetic material in the various magnetic circuits is efficiently used and for the most part carries either a unidirectional or an alternating (but not a pulsating) magnetic flux, in which the rotor is of light construction and adapted to operate satisfactorily at high speeds, in which cooling of the various parts of the generator or motor may be readily effected, and in which the output voltage of a generator may be designed to have virtually any desired A.C. waveform and in particular be of sinusoidal form substantially free from harmonic or alternatively be of square form in the sense commonly defined.

It is also well known that synchros of the "Selsyn" type suffer disadvantages in certain applications notably as torque receivers, because of the friction developed by the brushes which convey A.C. from the energizing source to coils on the rotor and which friction produces an angular uncertainly in the response or a torque receiver to a corresponding torque transmitter. Brushless synchros have therefore been developed but mostly suffer from the defect that the synchronising torques are very small and only suitable for control of the movement of a pointer. To avoid this defect, some brushless synchros employ transformer action to convey A.C. from the energizing source to the rotor but this artifice adds to the complication of the design, tends to increase undesirably the moment of inertia of the rotor, introduces uncertain phase shifts, and precludes the use of superimposed D.C. fields in the rotors of both a torque transmitter and torque receiver whereby relative motion of their shafts may be more efficiently damped, particularly under conditions where both synchros are mounted in a moving body of changing orientation such as an aircraft.

All synchros of the "Selsyn" type also suffer from the inherent disadvantage that, since the rotor is of generally cylindrical form with slots for the energizing windings and the stator is a slotted annulus surrounding the rotor, it is only possible to produce adequate magnetic flux densities in the radial gap between the rotor and stator by making the said gap very small. This procedure introduces structural difficulties, however, since to avoid serious errors in the response it is essential that the gap be perfectly uniform in the circular direction, requiring in turn extremely accurate machining of the rotor and stator and their assembly with exact concentricity. Such concentricity, even if initially exact, is difficult to maintain as a result of the wear which inevitably develops in the rotor bearings.

It is another object of the present invention, therefore, to produce a brushless synchro in which the aforesaid disadvantages, of a torque transmitter and torque receiver especially, are substantially overcome and the frictional error due otherwise to brushes is eliminated, in which the rotor is of such a form that the response is not sensibly affected by small axial or radial displacements relative to the stator, in which aperiodic or nearly aperiodic damping of relative movement between the shaft of a torque-receiver and the shaft of a torque transmitter may be effected by superimposed D.C. fields in both rotors, and which may be readily adapted as a control transmitter, control transformer, resolver, or a linear synchro.

According to one aspect of the invention an electrical machine comprises a stator, and a rotor, the stator comprising an inner annular flux carrying member wound with one or more pairs of toroidal coils, an outer annular flux carrying member which forms with the inner flux carrying member a magnetic circuit interrupted by two flux gaps, and means for establishing a magnetic field in said circuit, the rotor having parts which extend into said gaps, and which parts have angularly displaced portions of varying flux conductivity, so arranged that as the rotor rotates the direction and magnitude of the magnetic flux passing circumferentially around the inner flux carrying annular member alter, thus inducing an E.M.F. in the toroidal coils, or vice versa.

Preferably the two flux gaps are spaced apart axially on opposite sides of the inner annular member, and the rotor comprises two axially spaced radial flanges or discs lying in said gaps.

According to another aspect of the invention an electrical machine comprises a housing at least in part of magnetically conductive material and having a hollow interior closed at both ends, a shaft rotatably carried by bearings coaxially of said interior, annular pole pieces arranged coaxially one at each end of the interior, means for establishing a magnetic field internally between the two pole pieces, a generally annular stator inside the housing having end faces substantially parallel to the pole faces but spaced axially therefrom and having a central circular aperture through which the shaft passes, said stator being mounted coaxially about the shaft and serving to carry one or more interconnected pairs of toroidally wound coils which are regularly spaced apart in radial slots around the shaft axis, and two similar disc-like rotors axially spaced apart and mounted on the shaft each being arranged to occupy except for small clearances the axial space between an end face of the stator and a pole face and each having one or more shaped segments of magnetically conductive material embodied with magnetically nonconductive material, the two similar rotors being relatively angularly displaced about the shaft axis so that in the axial direction magnetically conductive material in one rotor is opposite magnetically nonconductive material in the other, and vice versa.

The magnetic flux between the two pole pieces thus finds a relatively easy path in an axial direction through the segments of magnetically conductive material in the rotors but is constrained to divide and flow circumferentially in opposite directions in the stator, thereby producing as the shafts and rotors rotate alternating magnetic fluxes in the circumferential direction which in turn generate alternating voltages in the coils on the stator. The wave form of these alternating voltages may be made substantially of any desired form (e.g. sinusoidal) by suitable shaping of the segments of magnetically conductive material in the rotors and in one aspect of the invention, when the magnetic flux between the two pole pieces is unidirectional, the machine may constitute a single-phase or multiphase A.C. generator.

According to another aspect of the present invention a source of D.C. supply comprises an A.C. generator constructed substantially as set forth in the preceding two paragraphs but with the magnetically conductive segments in the rotors so shaped that the wave form of the alternating voltages generated in the toroidally-wound coils of the stator is preferably (although not necessarily) of substantially square shape as commonly defined, the said voltages being rectified by fixed rectifiers of a known type, and in any known circuit suitable for the purpose, so as to produce a D.C. supply for an external circuit or circuits without any substantial superimposed ripple.

According to a further aspect of the present invention an A.C. synchronous motor comprises components of generally similar type to those in the A.C. generator hereinbefore described, a unidirectional magnetic field being created between the two annular magnetic pole pieces either by means of D.C. in solenoidal coils or by means of a permanent magnet. The pairs of toroidally-wound coils on the stator are distributed circumferentially thereon so that, on application of a multiphase A.C. voltage to them from a suitable external source of supply, rotating magnetic fields external to the stator are created which, by interaction with the aforesaid unidirectional magnetic field on the segments of magnetic material in the rotors, tend to exert torques on the said rotors and to cause them to rotate at a speed synchronous with the frequency of the source of supply.

According to a further aspect of the present invention a brushless synchro comprises components of generally similar type to those in the A.C. generator hereinbefore described but with the magnetic field created between the two annular magnetic pole pieces an alternating one with, in some applications, a superimposed unidirectional component. Two such brushless synchros may comprise a torque transmitter and torque receiver, which are not necessarily of the same dimensions but which are energized from a common source of supply and in which corresponding toroidally wound coils on the stators are connected in series-opposition so that movement of the shaft of the torque transmitter produces corresponding movement of the shaft of the torque-receiver as with torque synchros of the prior art. If desired, relative oscillatory motion between the two shafts may be aperiodically, or nearly aperiodically, damped by the action of the superimposed unidirectional components of the two aforesaid magnetic fields.

Alternatively, a brushless synchro as generally described in the first sentence of the preceding paragraph, but without a superimposed unidirectional magnetic field, may take the form of a resolver with two pairs of toroidally wound coils at right angles on the stator and with the segments of magnetic material on the rotors so shaped that the voltages induced in the coils are proportional to the sine and cosine respectively of the angular displacement of the shaft. If preferred, the segments of magnetic material may be so shaped that the voltages developed in one or more pairs of toroidally wound coils are proportional to the angular displacement of the shaft over a certain range, so that the arrangement constitutes a linear synchro.

A brushless syncro in accordance with the invention, and generally as described in the first sentence of the penultimate paragraph, may also take the form of a control transformer, in which case the shaft is actuated by a servomotor controlled by an amplifier. The toroidally wound coils on the stator have voltages induced in them from a control transmitter, depending upon the position of its rotor, and those voltages tend in general to create an alternating magnetic field through the annular magnetic polepieces of the control transformer which in turn induces an alternating voltage in solenoidal coils wound over the pole pieces. The said alternating voltages are applied to the amplifier, causing the servomotor to turn the shaft until a "null" position is reached, corresponding uniquely to the angular position of the rotor of the control transmitter, in which the voltage developed in the solenoidal coils is substantially zero.

Figure 2A:
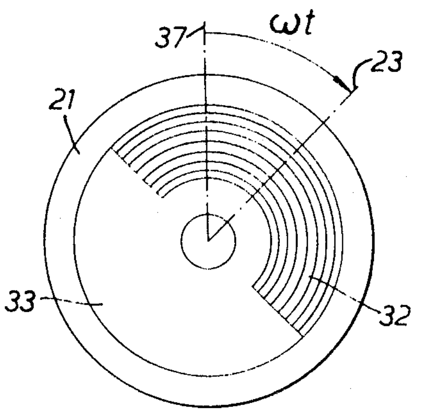
Figure 1B:
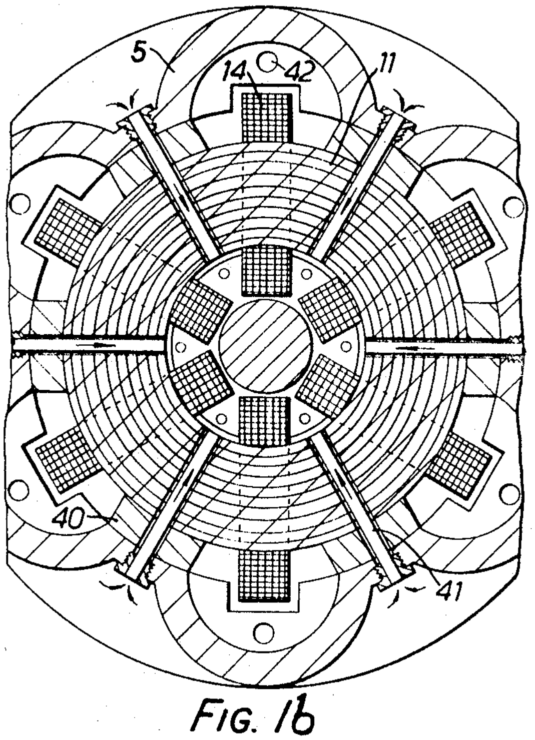
Figure 1C:
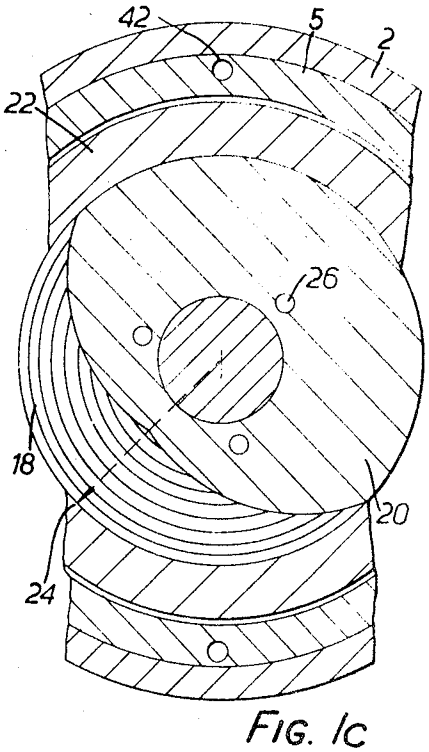
Figures 2B, 2C, 3:
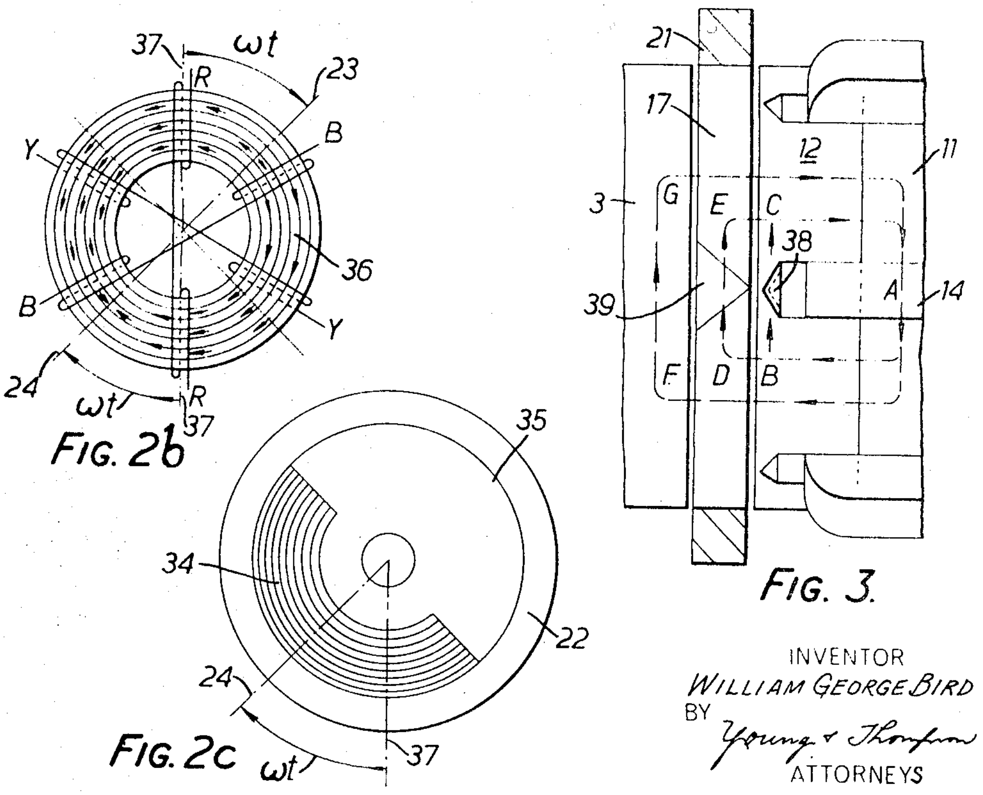
Figure 4:
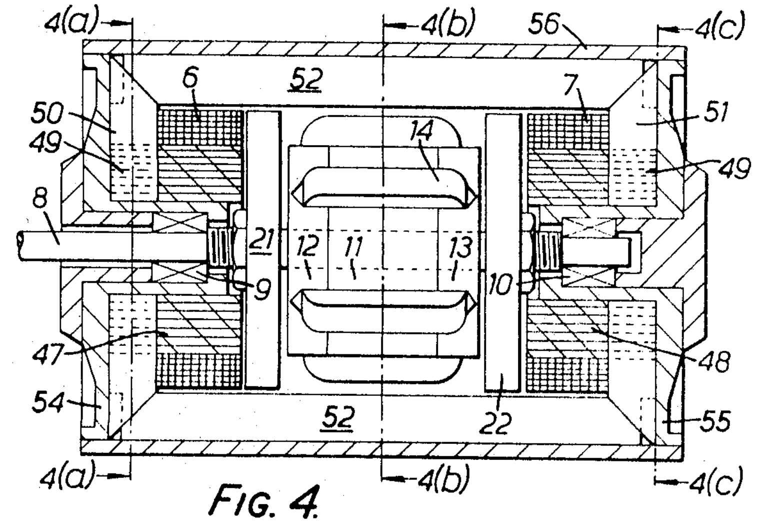
Figure 4A:
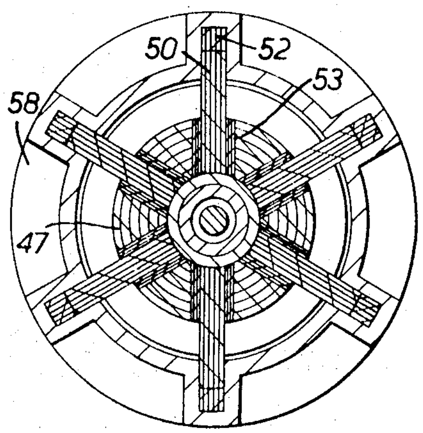
Figure 4B:
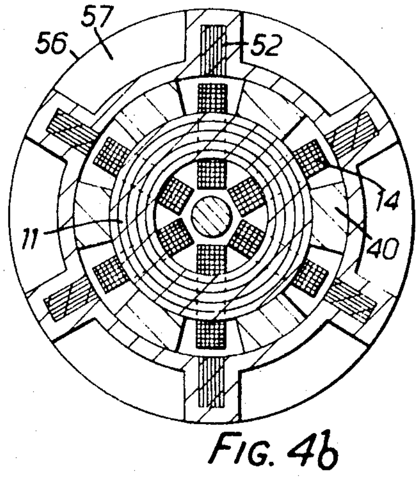
Figure 4C:
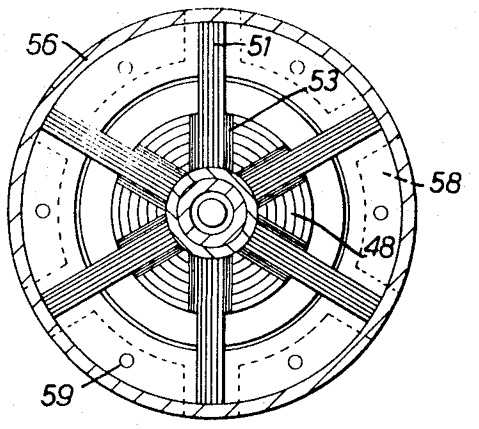
Figure 5:
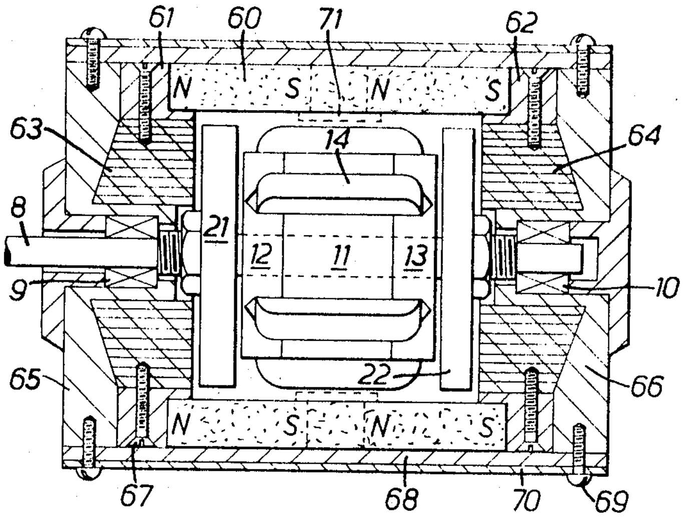
Figure 6A:
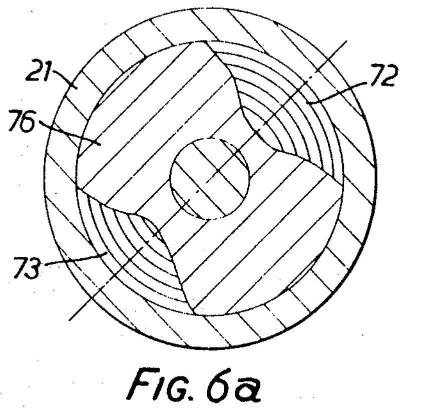
Figure 6B:
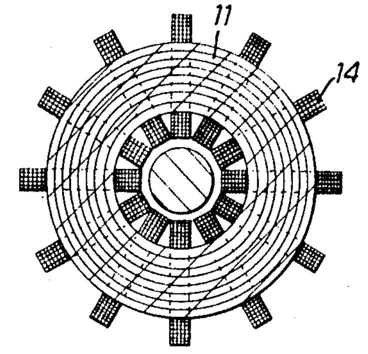
Figure 6C:
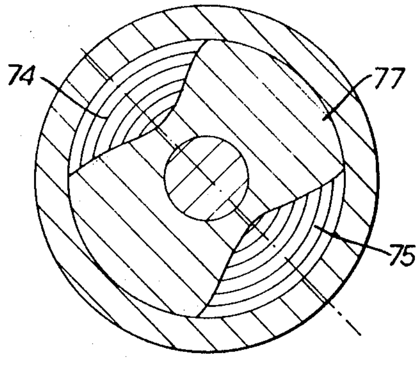
Figures 7A, 7B, 7C:
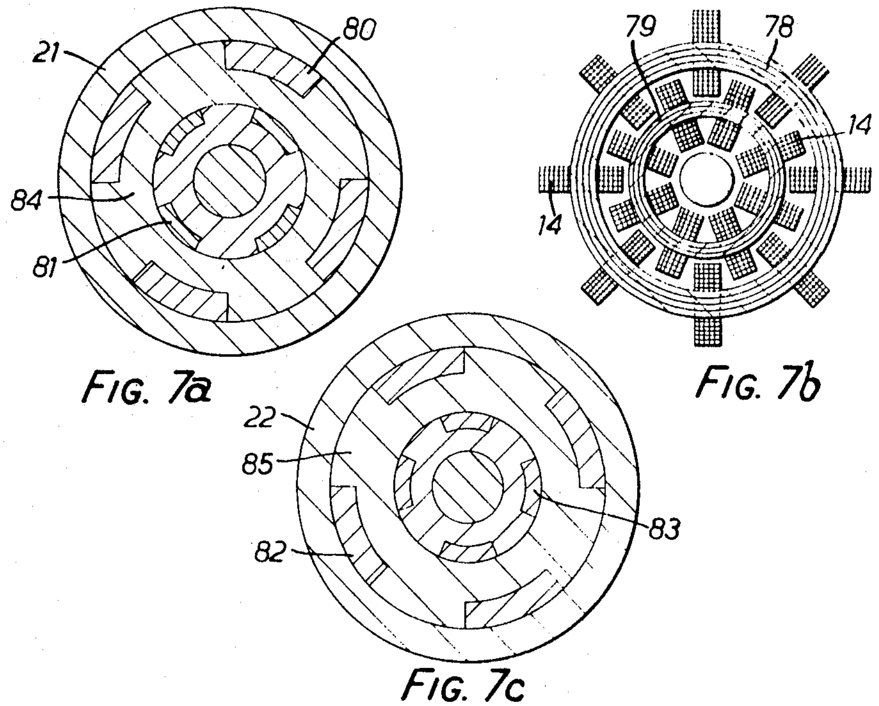
Figure 8A:
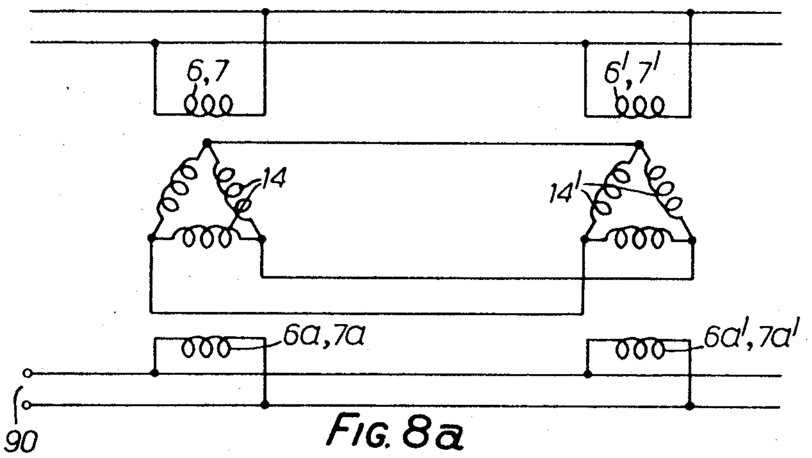
Figure 8B:
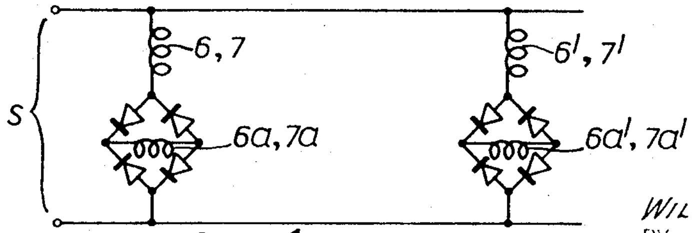

The invention will now be described further by way of example with reference to the accompanying drawings in which:

FIGURE 1 is a side view, sectioned in an axial plane except for certain parts displayed in relief, of a three-phase A.C. generator embodying the principles of the invention, FIGURES 1(*a*), 1(*b*), and 1(*c*) are cross-sections in three radial planes of the A.C. generator of FIGURE 1, looking towards the directions 1(*a*), 1(*b*) and 1(*c*) respectively shown in FIGURE 1, FIGURES 2(*a*), 2(*b*), and 2(*c*) are diagrams to explain more clearly the fundamental principles of the invention such as exemplified in FIGURE 1, FIGURE 3 illustrates a feature of the invention which may be incorporated in the A.C. generator depicted in FIGURE 1 and other embodiments, FIGURE 4 is a side view, sectioned in an axial plane except for certain parts displayed in relief, of an arrangement of the invention in which the magnetic circuits are fully laminated, FIGURES 4(*a*), 4(*b*), and 4(*c*) are cross-sections in three radial planes of the arrangement of FIGURE 4, looking towards the directions 4(*a*), 4(*b*) and 4(*c*) respectively shown in FIGURE 4, FIGURE 5 is a side view, sectioned in an axial plane except for certain parts displayed in relief, of an arrangement of the invention in which a permanent magnet is used to provide the internal magnetic field, FIGURES 6(*a*), 6(*b*), and 6(*c*) illustrate by means of cross-sections in three radial planes, corresponding to those of FIGURES 1(*a*), 1(*b*), and 1(*c*), the modifications required to double the frequency of the output, for a given speed, of the A.C. generator depicted in FIGURE 1, FIGURES 7(*a*), 7(*b*), and 7(*c*) illustrate by means of three further cross-sections in three radial planes the modifications necessary to convert the generator of FIGURE 1 to a square-wave generator suitable for use with a static rectifying circuit to produce direct current, FIGURE 8(*a*) illustrates the circuit connections of two similar machines interconnected to act as a synchro transmitter-receiver, and including superimposed D.C. damping coils in the field windings, and FIGURE 8(*b*) illustrates an alternative circuit for the field windings of a synchro transmitter-receiver, with D.C. coils connected in bridge rectifier circuits in series with the A.C. coils.

FIGURES 1 and 1(*a*), 1(*b*), and 1(*c*) of the drawings illustrate a three-phase sinusoidal A.C. generator the frequency of the electrical output of which is numerically the same as the rotational speed of the rotor in revolutions per second. For example, the frequency may be 400 c./s. and the rotor speed 24,000 rev./min. or 400 rev./sec.

The generator comprises two oppositely-facing cup-shaped end shields 1, 2 each attached to a tubular central and internal boss 3, 4, which end shields are mechanically coupled to the opposite ends of a tubular central casing 5, the said central casing being preferably corrugated in the circumferential direction in order to increase its mechanical strength and to facilitate dissipation of heat by radiation and convection. The end shields, bosses and central casing are formed of a magnetic material of high permeability such as a suitable iron alloy or mild steel and solenoidal coils 6, 7 are wound over each of the tubular central and internal bosses so that when direct currents from a suitable source flow in the said coils a magnetic field is created internally between pole pieces formed effectively by the opposite end faces of the bosses, the magnetic flux produced thereby having a return path of low magnetic reluctance through the sides of the end shields and central casing.

The shaft 8 of the generator, preferably made of a non-magnetic material such as an austenitic steel or a bronze, is coaxial with the tubular central and internal bosses and is supported by suitable bearings located within the end shields, for example by ball-bearings with a typical method of mounting such as represented by 9, 10. The generator comprises a centrally located tubular-shaped stator which is divided into three parts, a central part 11 (displayed partly in relief) and two similar outer parts 12, 13 (also displayed partly in relief). The central part comprises an annulus of laminated magnetic material of high permeability the cross-section of which may be rectangular and have any suitable relative dimensions but is preferably trapezoidal and synmetrical about a radial median plane, with the outer length of the trapezium parallel to the axis three times that of its inner length parallel to the axis and the inner radius of the annulus five-elevenths of its outer radius. Conveniently the said central part is constructed by winding spirally a strip of the magnetic material and then bending the resulting layers in the circumferential direction together by a suitable impregnating medium, whilst on grounds of economy the aforesaid strip may be initially appropriately tapered so that on winding it spirally, the desired trapezoidal form of the cross-section of the annulus is produced, the re-entrant conical end faces resulting therefrom being then if necessary ground or lapped until they are as smooth as possible. If the strip of magnetic material has a preferred direction of magnetisation, as is the case with grain-orientated silicon-iron for example, then the strip should be so wound spirally that the resulting easy direction of magnetisation in the annulus is circumferential.

Outside the central part of the stator are wound toroidally six coils, typified by 14, at regular intervals of 60° in the radial direction, opposite coils being connected together either in series or parallel and the three pairs of coils so formed being electrically connected together either in star or delta formation so as to constitute in effect three-phase windings. Each coil is preferably of rectangular cross-section and may be formed by winding toroidally layers of a wire of high electrical conductivity within the cheeks of a split former of insulating material but is preferably constructed by winding toroidally layers of a rectangular strip or tape of a material of high electrical conductivity such as copper or aluminium. The width of each coil is preferably such that it is substantially equal to one-twenty-fourth of the mean circumference of the annulus constituting the central part of the stator, and the radial depth of each coil is preferably such that it is substantially equal to three-eighths of the mean radius of the annulus.

If preferred, the central part 11 of the stator may be divided radially into equal segments, for example three, with the plane ends so formed ground or lapped to be as smooth as possible, whereupon the coils typified by 14 may be former-wound and slipped over the segments before assembly of the said central part into its ultimate annular form.

The two similar outer parts of the stator 12, 13 are in each case comprised of an annulus of laminated magnetic material of high permeability, which annulus is likewise of trapezoidal cross-section and the cylindrical outer and inner surfaces of which are continuous with those of the central part of the stator, whilst its inner end-face relatively to the centre of the stator is conical and ground or lapped to the same conical angle as the re-entrant conical end-face of the central part of the stator. To accommodate the coils typified by 14, and wound toroidally on the said central part of the stator, however, when all the parts of the said stator are assembled together, rectangular slots in the radial direction, typified by 15, are cut in each of the outer parts of the stator at regular intervals of 60°, the said slots being closed or nearly closed on the plane end face of the outer part of the stator which is remote from the centre of the stator by continuing the rectangular sides of the slot in the form of the sides of the letter V so that the two sides just touch at the bottom of the V along a radial line or are joined by a very narrow isthmus 16 of magnetic material along such a line.

Each of the outer parts 12, 13 of the stator may be initially constructed, as in the case of the central part 11, by winding spirally a strip of magnetic material of high permeability, which strip may also on grounds of economy be originally of tapered form, the resulting layers in the circumferential direction being subsequently bonded together in a suitable impregnating medium. If the strip of magnetic material has a preferred direction of magnetisation then in this case, unlike in the case of the central part of the stator, it should be so wound spirally that the resulting easy direction of magnetisation in the annulus is in the axial direction whilst, on assembly, the three parts of the stator should fit closely together along their common conical interfaces so as to offer as little as possible magnetic reluctance thereat.

In between the two magnetic pole pieces, constituted by the bosses 3, 4 and the central stator, are two similarly constructed disc-like rotors which are attached to the shaft and can rotate freely therewith. The said rotors have magnetic segments 17 (18) embodied with nonmagnetic segments 19 (20) and preferably have radial plane faces with small but sensibly uniform clearances in the axial direction between them and corresponding radial plane end faces on the magnetic pole pieces and stator. If desired, however, for the purpose of increasing the mechanical strength of the rotors against the centrifugal forces consequent upon rotation at high speeds, the said rotors may have end faces which are conical or bevelled in the radial direction, in which case the end faces of the magnetic pole pieces and of the stator are cut to an equal re-entrant conical angle so as to preserve sensibly uniform clearances between them and the rotors. In both cases the effects of centrifugal forces on a rotor may be counteracted by shrinking onto it an outer annulus or tyre 21 (22) of a material which is preferably nonmagnetic and of low electrical conductivity.

In order to facilitate precise static and dynamic balancing of a rotor it is desirable that the magnetic and nonmagnetic materials therein should have as nearly as possible the same density. To obviate also unwanted internal stresses which might otherwise arise from differential thermal expansion at high temperatures between the materials composing a rotor it is desirable that the magnetic and nonmagnetic components should have as nearly as possible the same coefficients of thermal expansion. Both of the aforesaid desiderata may be substantially complied with, if, for example, the magnetic material is iron of a high degree of chemical purity, or alternatively a silicon iron alloy, whilst the nonmagnetic material is a so-called stainless steel of austenitic composition alloyed with chromium and nickel, or alternatively a manganese steel.

The segment 17 (18) of magnetic material in each rotor has, as depicted in FIGURE 1(*a*), its outer boundary in a radial plane semi-circular in form and of radius $r_0$ whilst the inner boundary decreases symmetrically from the maximum outer radius $r_0$ to a minimum inner radius $r_1$ at the radian medial line 23 (24). The outer radius $r_0$ is designed to be slightly less than the outer radius of the magnetic material in the stator and the inner radius $r_1$ to be slightly greater than the inner radius of the same magnetic material in the stator. The length of the segment in the axial direction is equal to the thickness of the rotor in that direction so that the magnetic flux, flowing in the axial direction between the end faces of the pole pieces 3, 4 and the corresponding end faces of the stators finds a path of very much less magnetic reluctance through the segment 17 (18) of each rotor than elsewhere through the said rotor and, in fact, flows almost wholly through the said segment provided that its axial thickness, and ipso facto that the rotor, exceeds the sum of the axial clearances between the rotor and the adjacent end faces of the pole piece and stator respectively by a factor of twenty or more. This is the case, for example, if the thickness of the rotor is 0.5" and the two axial clearances are each 0.010", little advantage from the magnetic point of view being gained by thickening the rotor beyond such a value at the expense only of increasing its weight and moment of inertia.

The two rotors near opposite ends of the stator are attached to the shaft by suitable means, for example by taper pins passing through holes in the rotor typified by 25 (26) and coupling it to a collar 27 (28) sprocketed to a thicker central part 29 of the shaft 8, the whole assembly being rigidly retained together by a nut 30 (31) threaded onto the shaft 8. The two rotors are assembled so that the radial median lines 23, 24 of the respective segments of magnetic material therein point in opposite directions or, relatively to the shaft, are displaced 180° from one another. The end faces of the stator form virtually smooth and unbroken annular shaped surfaces by virtue of the fact that the slots in the outer parts 12 (13) of the stator are either joined thereon by narrow isthmuses 16 of magnetic material along radial lines or just touch along radial lines thereon. Hence at any given moment the magnetic flux from one pole piece 3 passes almost wholly in the axial direction, and with sensibly uniform flux density, through the segment of magnetic material 17 in the adjacent rotor and thence to the corresponding end face of the outer part 12 of the stator, along which outer part it then passes in the general axial direction between the slots and their associated coils.

Before however, the same magnetic flux can continue its passage in similar manner, but in reverse, between the end face of the other outer part 13 of the stator to the other pole piece 4 through the segment of magnetic material 10 in the other rotor, it has to be displaced through 180° relatively to the shaft, and to effect this it divides in a substantially symmetrical manner in the centre part 11 of the stator about the common axial plane comprising the oppositely-facing median lines 23, 24 of the segments 17, 18 respectively of the two rotors, one-half of the said magnetic flux passing circumferentially clockwise through the magnetic material of the centre part of the stator and the other half circumferentially counterclockwise. In doing so the said magnetic flux links in various degrees with the coils, typified by 14, wound toroidally over the said centre part of the stator, except for a very minute proportion which leaks circumferentially along the end faces of the stator outside the coils and either across the narrow isthmuses closing in the radial direction of the slots which accommodates the said coils or between the sides of the V-shaped outer terminations of the said slots.

The action may be more readily understood by reference to FIGURES 2($a$), 2($b$) and 2($c$), which represent in rudimentary form the principles of the invention. In these figures the rotor depicted in FIGURE 1($a$) is replaced by one having a segment of magnetic material 32 derived from one-half of a tube which has been divided in a diametral plane, the non-magnetic material being represented by 33. Similarly, the rotor depicted in FIGURE 1($c$) is replaced by one having a semitubular segment of magnetic material 34, the nonmagnetic material being represented by 35.

The three-part stator depicted in FIGURE 1 is replaced in FIG. 2($b$) by a simple annular stator 36 of rectangular cross-section in an axial plane, over which six single-turn coils are toroidally wound at equal intervals of 60°. Opposite coils are connected together in pairs, as indicated by RR, YY and BB, one coil of a pair being wound around the stator 36 in opposite sense to the other as shown. Each coil is supposed to be so thin as to lie ideally in an axial plane typified by 37 (indicated in the figures by dotted lines where it intercepts the plane of the paper).

The magnetic flux from the pole piece 3 to the pole piece 4 in FIGURE 1 may be imagined as passing vertically downwards into the plane of the paper, and with uniform density, through the segment of magnetic material 32, thence through the stator 36, and finally downwards out of the plane of the paper, and with uniform density, through the segment of magnetic material 34. Because of the 180° displacement of the radial median lines 23, 24 of the two rotors, however, this flux must divide symmetrically in the stator 36 above the common axial plane in which 23 and 24 lie and proceeds therein somewhat as shown by the arrows, one-half going clockwise and the other counterclockwise.

Since the density of the magnetic flux passing axially through the semitubular segments of magnetic material 32, 33 of the two rotors is unform, it follows that at any given moment the part of the magnetic flux linking with a particular coil, such as the upper one in the axial plane 37, is substantially equal to that part which passes axially through the semitubular segment 32 and is enclosed within an area of the radial cross-section thereof bounded, on the one hand, by the radial median line 23 of the segment and, on the other hand, by the radial median line in which the axial plane 37 of the particular coil concerned intersects the radial cross-section of the segment.

As, accordingly, the angle between the two median lines, denoted by $\omega t$, continually changes with the turning of the rotors at angular velocity $\omega$, it further follows that the magnetic flux passing through the particular coil also changes and that an E.M.F. is developed therein proportional to the rate of change of the said magnetic flux with time $t$ (assumed to be measured from the instant when the two median lines coincide). To this E.M.F. is added the equal E.M.F. developed in the lower coil in the axial plane 37, whilst the total E.M.F.'s developed in the other pairs of coils YY and BB will be of similar waveforms but lagging in time by $(2\pi/3\omega)$ and $(4\pi/3\omega)$.

Single-turn coils will, of course, produce very little voltage and the toroidal coils, each with a plurality of turns, which would be wound on the stator in practice would be bound to have a finite size. Nevertheless, the explanation given in the preceding two paragraphs is still valid for the stator arrangement depicted in FIGURE 1, since the outer faces of the stators actually opposite the rotors still form virtually continuous annular surfaces, whilst the axial plane 37 now becomes the median axial plane of the toroidal coil, which is designed to be the same as the axial plane passing through the apices of the V-shaped slot terminations in the outer parts of the stator.

All but a minute proportion of the magnetic flux therefore divides along the axial plane 37 in exactly the same fashion as in the ideal case depicted in FIGURES 2($a$), 2($b$) and 2($c$), and similarly divides in the central part of the stator as in the ideal case. The only effect of the finite width of the coils is to constrict the path of the magnetic flux flowing axially between the slots on the outer stators but this only necessitates reduction of its flux density through the segments of magnetic material on the rotors and does not otherwise affect the mode of action.

With the segments of magnetic material in the rotors of basically semitubular form however, the area between the two relevant median lines is clearly proportional at any given moment to the angle $\omega t$ between the two lines, whence it follows that the magnetic flux passing through any particular coil is of triangular wave form and the resulting E.M.F. generated in the coil has correspondingly a square wave form in the senses commonly defined. This is useful in some applications of the invention but objectionable in the present application as a three-phase sinusoidal A.C. generator.

It is, therefore, an important preferred feature of the present invention in one of its aspects that the segments of magnetic material in the rotors may be so shaped in their radial cross-section that the resulting output E.M.F.'s generated in the coils wound toroidally on the stator may have virtually any desired wave form, provided at least that it has no even harmonics, and in particular may be purely sinusoidal. This is effected by so shaping the said segments that the area of the radial cross-section bounded between the radial median line of the segment and any radius vector making an angle thereto is proportional to the time integral of the desired wave-form of the output E.M.F.'s during the time which it takes for the shaft and attached rotors to rotate through the said angle. Preferably, although not necessarily, such a relation is realized by maintaining the basic semitubular form of the segment in respect to its outer semicylindrical surface, which therefore still extends over an arc of 180° in the application of the invention so far considered (although it may be a submultiple of 180° in other applications) and by undercutting the segment in the axial direction so as to form a new inner surface, instead of a semicylindrical one bounded by plane ends. The curve of intersection of the said new inner surface with any radial plane in the segment is then made such that it is primarily in accordance with a mathematical equation of the "polar coordinate" type and is symmetrical about the radial median lines of the segment, as typified in FIGURE 1($a$) and FIGURE 1($c$). For example, in the application of the invention so far considered in which it is desired that the output E.M.F.'s should be sinusoidal, the said equation is $$r=\{r_o^2-(r_o^2-r_i^2)\cos\theta\}^{1/2}$$

where $r$ is the radius vector at an angle from the radial median line of the segment, $r_0$ is the outer radius of the segment, and $r_i$ is its minimum inner radius. The relative proportions of the sides of the trapezia forming the cross-sections of the central and two outer parts of the stator, and the width of the slots in the outer parts, may be then so chosen that the maximum density of the magnetic flux in the various parts of the magnetic material is as uniform as possible and hence the latter may be economic in weight and bulk. In particular, and as already stated, for a sinusoidal A.C. output the outer length of the trapezoidal cross-section of the central part of the stator parallel to the axis is preferably three times its inner length parallel to the axis, whilst the width of each coil and slot is preferably one twenty-fourth of the mean radius of the said central part.

Since, despite the rotation of the rotors, the magnetic flux passing axially through their segments of magnetic material 17, 18 remains constant if the field-excitation of the solenoidal coils 3, 4 be constant, there is often no necessity to laminate the said segments in order to counteract the effects of any eddy currents developed therein. Should, however, the said field excitation be subject to considerable and rapid fluctuation as, for example, for the purpose of output voltage control, then the said segments may be laminated in the circumferential direction and conveniently formed by winding spirally a strip or tape of magnetic material and of appropriate width into tubular shape, bonding the tube so formed with a suitable impregnating medium, sawing the tube diametrically and finally milling the resulting semitubular segments to the desired form of inner surface. If the magnetic material of the segments has a preferred direction of magnetization it should ultimately, of course, be in the axial direction in the segments.

In all cases, however, it is highly desirable that the tubular and central bosses 3, 4 constituting the annular magnetic pole pieces should be laminated, for which purpose each may be constructed, in a similar manner to the outer parts 12, 13 of the stator, by winding spirally a strip of magnetic material of high magnetic permeability (which strip may also on grounds of economy be originally of taper form), the resulting layers in the circumferential direction being subsequently bonded together in a suitable impregnating medium. One end, facing a rotor, is generally left plane to form a pole face whilst the other may be ground or lapped to a conical surface which makes intimate contact with a corresponding re-entrant conical surface machined in an end shield 1 (2).

In some applications of the invention, as a three-phase sinusoidal A.C. generator or otherwise, it may be desirable to modify slightly the outer parts 12, 13 of the stator, also the segments of magnetic material 17, 18 from the form in which they are depicted in FIGURE 1. These modifications are shown in FIGURE 3 as applied to the outer part 12 of the stator and segment of magnetic material 17, the angular position of the rotor being now, however, depicted in relief at the instant when the axial median plane of the said segment coincided with the axial median plane of a typical coil 14, that is to say when the apex of the V-shaped termination of the slot through which the coil 14 passes is in the said plane.

The first modification is that all the V-shaped terminations may be filled, or partially filled, in the radial direction by a material of high electrical conductivity such as copper or aluminium, for example by strips of such material typified by 38 each having a triangular cross-section similar to that of the V-shaped terminations so that they make intimate contact therewith along two of their sides and may, if desired, be bonded to them by a suitable adhesive. Alternatively, strips of a similar material of high electrical conductivity may be bent transversely to the same angle as that of the V-shaped terminations and bonded thereto, as indicated in FIGURE 3 by the dotted lines. When so fixed in position the plane outer face of the outer part 12 of the stator may then be machined down until any isthmuses such as depicted by 16 in FIGURE 1 are removed and the apices of the V-shaped terminations constitute, in effect, fine radial lines of contact on the said plane outer face.

One important effect of this modification is obviously to reduce substantially leakage of magnetic flux circumferentially along the end faces of the stator since such leakage can now only occur virtually through the strips 38 of material of high electrical conductivity and is therefore inhibited strongly by eddy current action.

The second modification is the provision of a radial groove 39 of V-shaped cross-section along the radial median line of the segment of magnetic material 17, with the apex of the V facing the stator as shown. The reason for this modification is that it tends to reduce the armature reactance of the stator coils, this being analogous to the armature reactance in alternators of conventional and known type. Thus in the absence of both modifications current in the coil 14 can produce a leakage magnetic flux around the path ABC and also, across the air gap between the stator and rotor, one around the path ADE. With the modifications provided, however, any leakage magnetic flux is virtually constrained to take the path AFG of very much higher magnetic reluctance involving, as it does, the passage of a further two airgaps. This feature is of particular importance when the load on the A.C. generator is a substantially resistive one.

The three-phase sinusoidal A.C. generator as hereinbefore described, and in particular its central stator with toroidal windings, may be ventilated and cooled in any convenient way, and one very suitable method is represented in FIGURES 1, 1(*a*), 1(*b*) and 1(*c*) and will be described by way of example. In accordance with this method the stator is centrally located with respect to the central casing 5 by means of a series of radial spacing pieces, typified by 40, between the toroidal coils, each extending axially along the stator and making intimate contact with, on the one hand, the outer surface of the magnetic material of the stator and on the other hand, the inner surface of the central casing. The said radial spacing pieces are necessarily constructed of a nonmagnetic material and preferably of a material of high thermal conductivity such as copper or aluminium. A series of radial tubes, typified by 41, traverse in succession right through the central casing, the spacing pieces, and the magnetic material of the stator so that a cooling fluid such as air can pass down through the tubes to the space between the inside of the stator and the shaft, whence it turns in either direction towards the opposite ends of the shaft and finds a return path for the most part as depicted by the arrows in FIGURE 1, i.e., radially outwards through the spaces between the outsides of the toroidal coils and the V-shaped ends of the radial slots in the outer parts of the stator which accommodate the said toroidal coils. Having reached in this way the spaces around the outsides of the toroidal coils, the fluid is then turned to pass axially through a plurality of axial holes, typified by 42, thence along the outer surfaces of the solenoidal coils 3, 4, and finally out of the A.C. generator through a plurality of holes typified by 43.

If the cooling fluid be a gas, vigorous flow may be stimulated by affixing radial vanes 44 (45) to the collars 27 (28) mounted on the shaft 8, the rotation of which then produces by centrifugal force a pressure gradient acting radially outwards in the gas. If desired, on the other hand, the cooling fluid may be a liquid such as an oil, in which case it is preferred that the radial vanes 44 (45) be omitted so that no undue turbulence is created in the liquid, which liquid may then be circulated in a closed circuit by means of an external pump and arranged to pass through a heat exchanger.

As a further alternative, and after suitable precautions have been taken either to seal the various components or otherwise to protect them against corrosion, a cooling liquid such as water may be introduced through the radial tubes typified by 41, the inner ends of the tubes being then adapted by known means such as small orifices to produce a fine spray of the liquid which is converted to a vapour by the internal heat of the generator. The vapour may then be reconverted to the liquid in an external heat exchanger and recirculated, it being noted that with this method the heat-absorbing power of a liquid inherent in its latent heat of vaporization is utilised.

It will also be noted that in all cases the flow of the fluid radially outwards through the spaces between the outsides of the toroidal coils and the V-shaped ends of the radial slots in the outer parts of the stator produces a venturi effect which tends to remove fluid from the surfaces of the rotors and reduce the viscous resistance to their rotation. This friction tends, moreover, to be minimized in any case because of the disc-like construction of the rotors and the absence of irregularities thereon.

In some applications of the invention, for example as a three-phase A.C. generator in which the field excitation is subject to considerable and rapid fluctuations for the purpose of output voltage control, it may be desirable to laminate the whole of the field magnetic circuit and not only the annular pole-pieces, the segments of magnetic material in the rotors, and the stator. Such complete lamination may be carried out in a number of different ways, and one very convenient means is depicted in FIGURES 4, 4(*a*), 4(*b*) and 4(*c*).

In this arrangement of the invention, the rotors and stator may be of generally similar construction to that depicted in FIGURES 1, 1(*a*), 1(*b*) and 1(*c*) and are shown in relief in FIGURE 4. The annular pole pieces 47, 48 are constructed in a similar fashion to the corresponding members 3, 4 in FIGURE 1 but in each case both ends are now made plane and a plurality (for example the six shown in FIGURE 4) of radial slots of rectangular cross-section, indicated by 49, are cut at the outer end at regular intervals in the circumferential direction. Each of the said radial slots accommodates a bonded stack of laminated strips of magnetic material, typified by 50 and 51, which projects radially and is bevelled at its radial extremity at an angle of 45° so that it makes intimate contact with a bonded stack of laminated strips of magnetic material 52 extending axially between the bevelled ends of the stacks 50, 51 and also bevelled at both ends at 45°.

In this way a return path is provided for the magnetic flux generated internally between the annular pole pieces 47 and 48 by current in solenoidal coils 6, 7 wound over them, but in order that the return path be of low magnetic reluctance certain precautions should be taken. Thus, the magnetic material constituting the stacks of laminations 50, 51 and 52 should preferably be anistropic, such as grain-orientated silicon iron, with its preferred direction of magnetisation lengthwise along the stacks. The bevels on the stacks should preferably be ground or lapped so that the magnetic reluctance at their joints is as small as possible, whilst each radial stack such as 50 should be in intimate contact with its appropriate pole piece 47 along their common surface in the radial plane but not along the planes of the stacks in the axial direction, otherwise the flow of magnetic flux perpendicular to the plane of lamination will engender unwanted eddy currents. To prevent this possibility, nonmagnetic shims or packing pieces typified by 53 may be inserted as shown.

The radial stacks of laminations 50 (51), annular pole pieces 47 (48), and solenoidal coils 6 (7) are affixed to end shields 54 (55) of nonmagnetic material which also support the shaft 8 in suitable bearings 9 (10). The axial stacks of laminations 52 are accommodated in slots on a central casing 56 of nonmagnetic material which is corrugated in the circumferential direction and which has webs 57, 58 between the corrugations at both ends the outer faces of which are machined to form seatings for the end shields 54 and 55, respectively. On assembly, the end shields with their attached parts and the central casing with its attached parts may then be coupled together by a plurality of axial screws on a pitch circle as typified by 59.

The method by which the stator is located inside the central frame may be similar to that depicted in FIGURE 1(*b*) and comprise a series of radial spacing pieces, typified by 40, between the toroidal coils, each extending axially along the stator and making intimate contact with, on the one hand, the outer surface of the magnetic material of the stator and, on the other hand, the inner surface of the central casing 56. These spacing pieces may be traversed by radial tubes (not shown in FIGURE 4(*b*)) of similar form to those in FIGURE 1(*b*), which may serve as a means of ventilation generally as hereinbefore described in connection with the arrangement depicted in FIGURE 1.

If desired, the arrangement of the invention depicted in FIGURES 1, 1(*a*), 1(*b*) and 1(*c*) may be modified to form a permanent-magnetic three-phase sinusoidal A.C. generator, one very convenient means of doing so being depicted in FIGURE 5.

In the new arrangement the rotors and stator may be generally similar construction to that depicted in FIGURES 1, 1(*a*), 1(*b*) and 1(*c*) and are shown in relief in FIGURE 5. The magnetic field is provided by an annular permanent magnet 60, magnetized in the axial direction as shown, which is permanently attached by suitable means to collars, 61, 62 at either end, the said collars being of soft iron or similar magnetic material. The annular pole pieces 63, 64 are laminated and constructed in a similar fashion to the corresponding members 3, 4 of FIGURE 1, and are affixed to end shields 65, 66 of nonmagnetic material which also support the shaft 8 in suitable bearings 9, 10.

On assembly the collars 61, 62 are coupled to the pole pieces 63, 64 respectively by countersunk screws typified by 67 and a cylindrical outer casing 68 of nonmagnetic material is slid over the magnet 60 and end shields 65, 66 being then coupled to the end shields by screws such as typified by 69. If desired, the outer casing 68 may have an external shield 70 of magnetic material to prevent leakage flux from the permanent magnet 60 affecting adjacent apparatus.

It will be noted that the method of construction permits dismantling of the equipment for maintenance or repair without open-circuiting magnetically the permanent magnet 60. This is effected by removing successively the screws 69, outer casing 68 and screws 67, but leaving the pole pieces 63, 64 and associated end shields 65, 66 respectively in situ temporarily. An annular keeper of U-shaped cross-section may then be slid over the permanent magnet 60 until it makes intimate contact with the soft-iron collars 61, 62, after which the end shields and associated pole pieces may be safely removed. The converse series of operations is carried out on re-assembly.

The stator may be located inside the assembly by similar means to those adopted in the arrangements depicted in FIGURES 1(*b*) and 4(*c*), that is to say by spacing pieces between the toroidal coils and making intimate contact with, on the one hand, the outer surface of the magnetic material of the stator and, on the other hand, the inner cylindrical surface of the permanent magnet 60. Since this method involves drilling and tapping the permanent magnet 60, it is preferred that the magnetic material thereof should be sintered and adapted to such procedure. Alternatively, the permanent magnet 60 may be divided into two halves separated by a soft iron collar to which the spacing pieces are screwed. The alternative arrangement is indicated by the dotted lines 71 in FIGURE 5.

The invention may also be carried into effect in a number of other ways, most of which are modifications and adaptations of the arrangement or embodiment as a three-phase sinusoidal A.C. generator hereinbefore described. Thus it may be desired to produce such a generator the frequency of the electrical output of which is numerically a multiple of the angular speed of the rotor in revolutions per second. For example, the desired frequency may be 400 c./s. and the rotor speed 12,000 rev./min. or 200 rev./sec., or the desired frequency may be 400 c./s. and the rotor speed 8,000 rev./min. or 133⅓ rev./sec.

If the desired frequency of the electrical output of a three-phase sinusoidal A.C. generator be twice the angular speed of the rotor in revolutions per second, then the general construction of such a generator may be substantially as hereinbefore described except for certain modifications to the rotors and stator illustrated in FIGURES 6(*a*), 6(*b*) and 6(*c*). Thus each rotor may now comprise two oppositely facing segments 72, 73 (74, 75) of magnetic material embodied in nonmagnetic material 76 (77), the said magnetic segments having outer surfaces of cylindrical form but now extending over an arc in radial cross-section of only 90° instead of 180° and with the inner surfaces shaped so as to have cross-sections in accordance with the mathematical equation hereinbefore displayed but with the parameter $\theta$ therein now replaced by the parameter $2\theta$. The two rotors are mounted on the shaft so that the radial median lines of the segments therein are displaced 90° relatively to the shaft and with respect to one another.

If the segments of magnetic material in the rotors have the same outer radius and minimum inner radius as in the first-described embodiment, the stator is now preferably constructed with the lengths of its central part parallel to the axis one-half of those in the first-described embodiment, but with the same ratios of outer to inner length and of outer to inner radius. There are now twelve, instead of six, coils wound toroidally over the said central part, each coil having a width substantially equal to one-forty-eighth of the mean circumference of the stator but, as before, a radial depth equal to three-eighths of the mean radius of the stator.

In general, and using simple mathematical terms, if the desired frequency of the three-phase A.C. sinusoidal generator be N times the angular speed of the shaft in revolutions per second, then each rotor comprises N segments of magnetic material the radial median lines of which are displaced $(360/N)°$ from each other, each segment having an outer cylindrical surface extending over an arc of $(180/N)°$ and an inner surface shaped in cross-section in accordance with the mathematical equation hereinbefore displayed but with the parameter $\theta$ therein substituted by $(N\theta)$. The two rotors are mounted on the shaft so that the directions of their radial median lines are displaced $(180/N)°$ with respect to one another and relatively to the shaft. The lengths of the central part of the stator parallel to the axis are preferably $(1/N)$th of those in the first-described embodiment of the invention, the ratios of the outer to inner length and outer to inner radius remaining the same, however, whilst there are now (6N) coils wound toroidally over the said central part, the width of each coil being substantially equal to $(1/24N)$th of the mean circumference of the stator and its radial depth equal to three-eighths of the mean radius of the stator.

The invention may also be embodied in a two-phase A.C. generator, in which case the general construction may be substantially as described in connection with the previous embodiments except that there is now a different number of slots and coils on the stator. If the desired frequency of the two-phase A.C. generator be N times the angular speed of the shaft in revolutions per second then each magnetic segment in the rotor extends over an arc of $(180/N)°$ and there are (4N) coils wound toroidally over the central part of the stator, one half producing voltages in quadrature with the other half. The width of each coil is preferably equal to $(1/16N)$th of the mean circumference of the stator with, as before, its radial depth equal to three-eighths of the mean radius of the stator.

Similarly, the invention may be embodied in a single-phase A.C. generator, in which case the general construction may be again substantially as described in connection with the previous embodiments except for a different number of stator slots and coils. For a desired frequency of N times the angular speed of the shaft in revolutions per second then each magnetic segment in the rotor extends over an arc of $(180/N)°$ and there are (2N) coils wound toroidally over the central part of the stator, the width of each coil being preferably equal to $(1/8N)$th of the mean circumference of the stator. If N be greater than one, the preferred radial depth of each coil is three-eighths of the mean radius of the stator.

In some cases, however, and particularly when N is equal to one, the slots in a stator so constructed may be undesirably wide relatively to the mean circumference of the stator. In such a case, it may be preferred that single-phase A.C. voltages be produced from a fundamentally two-phase A.C. generator constructed in accordance with the invention, in which generator the pairs of coils of the two phases are connected in series, so producing a single-phase voltage output of $\sqrt{2}$ times the voltage developed in each phase. Alternatively, a single-phase voltage may be produced from a fundamentally three-phase A.C. generator constructed in accordance with the invention, in which generator the pairs of coils of two of the phases are connected in series-conjunction with one another and are both connected in series-opposition with the pairs of coils of the third phase, so producing a single-phase voltage output which is double that developed in the pairs of coils of each phase.

Any one of the previously described embodiments of the invention, but preferably those employing permanent magnet excitation, may also, if desired, be adapted to produce increased power output by the incorporation in the generator of two or more stators, substantially as hereinbefore described, in sequence along the axial direction of the shaft. Between consecutive stators there is then located a rotor of appropriate type and substantially as hereinbefore described, the said rotor having shaped segments of magnetic material adapted to conduct the common exciting magnetic flux in the axial direction between the two consecutive stators and the directions of the radial median lines of the said segments being displaced relatively to the shaft in consecutive rotors as before.

The invention may also be applied to D.C. generators. For such an application any one of the A.C. generators hereinbefore described may be utilized if desired, the A.C. output therefrom being subsequently rectified in known systems comprising fixed rectifiers, for example of the semi-conductor type. In order to improve the efficiency of rectification, however, and in particular to eliminate as far as possible ripple in the resulting D.C. output, it is preferred that an A.C. generator of one or other of the various types already described be suitably modified so as to produce A.C. voltages which have a substantially square wave form in the sense commonly defined, instead of a sinusoidal one. It is accordingly an important advantage of the present invention that, as already indicated, wave forms of such a type tend inherently to be produced in an A.C. generator constructed in accordance with the principles of the present invention, and that the construction of a corresponding D.C. generator is therefore in some respects simplified.

For example, the shape of the segments of magnetic material in the rotors may now, if the frequency of the A.C. output be equal to the rotational speed of the shaft in revolutions per second, be of the basic semitubular form depicted in FIGURES 2(*a*) and 2(*c*) so that the semi-cylindrical outer and inner surfaces of each extend over an arc in cross-section of 180°. If, on the other hand, the frequency of the unrectified A.C. output be a multiple of the rotational speed of the shaft in revolutions per second then, as has also been already indicated, the outer and inner surfaces of each of the segments extend over an arc of the corresponding submultiple of 180° but still may be constructed, if desired, by the simple method of cutting a sector out of a tube by two radial saw cuts.

Again, the construction of a stator is simplified since the cross-sections of the annuli of magnetic material forming the three parts thereof may now be rectangular instead of trapezoidal and, in particular, the cross-section of the central part is preferably square. In order, however, to ensure a reasonable degree of uniformity in the density of the magnetic flux passing through the various parts of the stator it is desirable that the inner radius of the stator should be proportionally greater relatively to its outer radius than in the case of a sinusoidal A.C. generator constructed in accordance with the invention. It is also desirable for the utmost efficiency that the number N of coils on the stator should be at least six and that the width of each coil should be equal to (½N)th of the mean circumference of the stator. All the above desiderata can be complied with if, for example, there are eight coils, each of width equal to one-sixteenth of the mean circumference of the stator, and the inner radius of the stator is approximately nine-elevenths of its outer radius.

Despite its efficiency in other respects, however, the forms of construction described in the previous paragraph obviously tends to cause undesirable wastage of space between the inside of the stator and the shaft and, accordingly, in a further possible modification according to the present invention, as depicted in FIGURE 7(*b*), two stators 78, 79 of tubular shape as already described are located one within the other, each in association with segments of magnetic material, typified by 80, 81 (82, 83) on the rotors 84 (85) as depicted in FIGURES 7(*a*) and 7(*c*). Each segment of magnetic material has substantially the same inner and outer radii as the associated stator and has a cross-section in the simple form of a sector cut out of a tube. If desired, and space permits, additional stators may be located inside the pair just described.

For economy of space the toroidal coils wound on immediately adjacent stators, one within the other, are preferably staggered relatively to one another, and likewise the corresponding sets of segments of magnetic material, so that the voltage outputs of all the coils are substantially in phase. To ensure balance of the final outputs it is desirable that each coil on an innermost stator is connected in series-conjunction with one on the outermost and any intermediate stator. The groups of coils so formed may then be connected in any desired series-parallel combination to produce the desired voltage and current output which may then be applied to a fixed rectifying system of any known and convenient type, comprising for example semi-conductor rectifiers in the well-known bridge configuration. Alternatively, the segments of magnetic material on the rotors and the coils on the stators may be so disposed as to produce three-phase A.C. of substantially square wave form which is then applied to semiconductor rectifiers in the well-known three-phase rectifier configuration.

It is apparent that, by virtue of the reciprocal relationship which exists between electrical generators and motors in general, any one of the sinusoidal three-phase or two-phase A.C. generators in accordance with the present invention and as hereinbefore described will, as long as the excitation is by means of a unidirectional magnetic flux, act also as and A.C. synchronous motor. If, for example, the said excitation be produced by direct currents in solenoidal coils or alternatively by a permanent magnet then, on application of a three-phase or two-phase A.C. voltage-supply to suitably wound toroidal coils on a stator or stators, rotating magnet fields external to the stator or stators are created which, by interaction with the aforesaid unidirectional field on the segments of magnetic material in the armatures or rotors, tend to exert torques thereon and to cause them to rotate at a speed synchronous with the frequency of the aforesaid three-phase or two-phase A.C. voltage supply.

It is further apparent that, is particular, the embodiment of the invention depicted in FIGURES 4, 4(*a*), 4(*b*) and 4(*c*) may be readily adapted to function as a brushless synchro. If, for example, the solenoidal coils 6, 7 are energized from a source of single-phase A.C. which also energizes a torque transmitter, and opposite pairs of toroidally wound coils on the stator 11 are connected to the three output terminals of the torque transmitter then, with suitable choice of the numbers of turns on the solenoidal and toroidally wound coils, the embodiment will function as a torque receiver and its rotor will take up a position corresponding to the position of the rotor in the torque transmitter.

Preferably the torque transmitter is also as depicted in FIGURES 4, 4(*a*), 4(*b*) and 4(*c*) and may, for simplicity, be of similar construction and size to the torque receiver. If, however, the torque transmitter be required to actuate a plurality of torque receivers in parallel, then the torque transmitter may be of larger size to reduce the output impedance of its toroidally wound coils in comparison with the input impedance of the toroidally wound coils of each torque receiver so that malfunction in any one will not substantially affect the accuracy of response of the others.

Since the magnetic flux flowing between the annular pole pieces 47, 48 is now an alternating one, to avoid the deleterious effects of eddy currents it is important to ensure that the nonmagnetic material in the rotors, and in particular the tyres 21, 22, shall be of electrically non-conductive material also. The said material may conveniently be, therefore, a suitable plastic, use of which has the further advantage of lightening the rotors and reducing their moment of inertia. To avoid deleterious effects from magnetic flux leakage it is also desirable to incorporate in the rotors and stator the modifications depicted in FIGURE 3.

The invention in its embodiment as a torque receiver has several advantages over torque receivers of the prior art, apart from the elimination of brushes. In the first place, its construction is relatively simple and cheap for a given accuracy since, in particular, the response is not sensitive to small displacements of the shaft and attached rotors, and problems of producing and maintaining concentricity in the various parts do not arise. This is because such displacements in the axial direction do not alter the sum of the air gaps through which the energizing magnetic flux passes from a pole-piece, through the segment of magnetic material in a rotor, to the stator and therefore the total reluctance of the magnetic circuit is not substantially altered thereby nor, ipso facto, the voltage developed in a toroidally wound coil on the stator at a given angular position of the rotor.

Similarly, small displacements of the shaft and an attached rotor radially along the radial median line of its segment of magnetic material do not affect the reluctance of the magnetic circuit, or the voltage developed in a toroidally wound coil, provided that the outer radius of both the annular pole pieces and stator is sufficiently greater than the maximum radius of the said segment, and the inner radius of both the annular pole pieces and stator is sufficiently less than the minimum radius of the said segment, to avoid substantial change of the flux fringe patterns with such displacements. Small displacements of the shaft and an attached rotor radially at right angles to the radial median line of the segment of magnetic material will, however, increase the voltage developed in one toroidally wound coil of an associated pair but, as it decreases by a substantially equal amount the voltage developed in the other of the pair, their sum remains the same if they are wound in series and again no deleterious effect results.

A further advantage of the embodiment is that substantially greater synchronizing torques may be developed as compared with those in torque receivers of the prior art, owing to the fact that it is practicable to utilize higher magnetic flux densities in the energizing magnetic circuits, as is well known, the synchronizing torques tend to vary as the square of this flux density. It is also practicable to superimpose uni-directional or steady magnetic fields upon the alternating magnetic fields energizing both torque transmitter and torque receiver and thereby provide a means for damping relative oscillatory motion between their two shafts without recourse to means, known to be unsatisfactory under certain circumstances, employing viscous or static friction, eddy currents, inertia discs, or the like.

A superimposed unidirectional or steady magnetic field as just described only induces voltages in the toroidally wound coils on the stator when the rotor is rotating and may be made of such magnitudes in both a torque transmitter and torque receiver that rotations of their respective rotors at the same angular velocity produce equal and opposite voltages at any given moment when the rotors are in the corresponding equilibrium positions that they would take up if not rotating. No currents are therefore produced in the toroidally wound coils and, in consequence, no torques on the rotors. Should, however, the said rotors be in such equilibrium positions at any given moment but be rotating with different angular velocity, then unequal voltages are induced in the toroidally wound coils and, as a result, torques are developed which tend to damp down relative oscillatory motion between the two rotors.

The superimposed unidirectional or steady magnetic fields may be provided in various ways but conveniently by D.C. in auxiliary windings forming parts of the solenoidal coils 6, 7 on the annular pole pieces 47, 48, respectively. The said D.C. may be produced, if desired, from a D.C. supply common to both torque transmitter and torque receiver or by rectification from their common A.C. supply, and a suitable variable resistor may be incorporated in each D.C. circuit to adjust to an appropriate value the current in each auxiliary winding and with it the amount of damping of relative motion of the rotors.

In a preferred arrangement, however, the auxiliary windings of the solenoidal coils may, in both torque transmitter and torque receiver, constitute the cross arm of an assembly of static rectifiers in the well-known bridge configuration, the said assembly being in series with the main A.C. energized solenoidal coils. The common A.C. supply voltage is applied to this combined circuit with the result that, due to the action of the rectifiers in maintaining the current through the auxiliary coils always in the same direction, the A.C. supply voltage may be regarded as applied to a coil in which during any one half-cycle the number of effective turns is the sum of the actual number of turns on the main and auxiliary coils, whilst in the succeeding half-cycle the number of effective turns is the difference of those quantities. As a result the amplitudes of the magnetic fluxes developed in successive half-cycles are different although both are still of substantially sinusoidal form, and the magnetic flux may be regarded as comprising an alternating component together with a unidirectional one.

For example referring to FIGURE 8(*a*) the solenoidal field coils 6, 7 of a synchro transmitter (of the construction illustrated in FIGURE 4) are energized from the same A.C. supply which also energizes the field coils 6', 7' of the synchro receiver. The three-phase toroidal windings 14 of the transmitter are interconnected in delta with the toroidal windings 14' of the receiver. The rotors of the two machines of course carry no windings but interact with the magnetic fields of the machines and tend at all times to assume the same relative angular positions. The field coils 6, 7 and 6', 7' also incorporate auxiliary field windings **6*a*, 7*a*, and 6*a'*, 7*a'*, these auxiliary windings being energized from a common D.C. supply 90**. Alternatively as illustrated in FIGURE 8(*b*) the auxiliary windings may be connected in rectifier bridge circuits in series with the respective main field windings, across the A.C. supply.

If desired, the embodiment of the invention depicted in FIGURES 4, 4(*a*), 4(*b*) and 4(*c*) may constitute a resolver if the stator be wound toroidally with four coils as described hereinbefore in connection with the application of the invention as a two-phase A.C. generator with frequency output equal to the speed of the rotor in revolutions per second. That is to say, the segments of magnetic material in the rotors have the shapes depicted in FIGURES 1(*a*) and 1(*c*) but, of course, the exciting magnetic field is now alternating. Alternatively, if the shapes of the segments of magnetic material in the rotors have the semitubular form depicted in FIGURES 2(*a*) and 2(*c*), the arrangement constitutes a linear synchro over the angular range of $\pm 90°$.

In a further embodiment of the invention the arrangement depicted in FIGURES 4, 4(*a*), 4(*b*) and 4(*c*) may constitute a control transformer, in which case the shaft 8 is mechanically coupled to a servomotor controlled by an amplifier. The three pairs of toroidally wound coils typified by 14 on the stator have voltages induced in them from a control transmitter, depending upon the position of its rotor, and these voltages tend in general to create an alternating magnetic field through the annular pole pieces 47, 48 which in turn induces an alternating voltage in the solenoidal coils 6, 7. The said alternating voltages are applied to the amplifier, causing the servomotor to turn the shaft 8 until a "null" position is reached, correspondingly uniquely to the angular position of the rotor of the control transmitter, in which the voltage developed in the solenoidal coils 6, 7 is substantially zero.

I claim:

1. An electrical machine comprising a stator, and a rotor, said stator comprising an inner annular flux carrying member, a plurality of pairs of toroidal coils wound on said member, an outer annular flux carrying member which forms with said inner flux carrying member a toroidal magnetic circuit interrupted by two flux gaps spaced apart axially on opposite sides of the inner annular member, and means for establishing a magnetic field in said circuit, said rotor having two axially spaced parts which extend into said gaps, and which parts have angularly displaced portions of different flux conductivity, so arranged that as the rotor rotates the direction and magnitude of the magnetic flux passing circumferentially around the inner flux carrying annular member alter, thus inducing an E.M.F. in the toroidal coils, or vice versa.

2. An electrical machine as claimed in claim 1, in which the parts of the rotor which lie in said gaps each have portions of magnetically conductive material alternating with portions of magnetically nonconductive material, and so arranged that when a conductive portion lies in one gap on one side of the main rotor axis a nonconductive portion lies in the other gap on the same side of the rotor axis, and a conductive portion lies in said other gap on the opposite side of the rotary axis.

3. An electrical machine as claimed in claim 1, wherein said field means establishes a unidirectional magnetic field in the magnetic circuit.

4. An electrical machine as claimed in claim 3, wherein said field means includes permanent magnet means for establishing the magnetic field.

5. An electrical machine as claimed in claim 1, wherein said field means includes means for establishing an alternating magnetic field in said magnetic circuit.

6. An electrical machine as claimed in claim 5, wherein said field means includes means for imposing a steady magnetic flux superimposed on the alternating magnetic flux.

7. An electrical machine comprising a housing formed at least in part of magnetically conductive material and having a hollow interior of generally cylindrical form closed at both ends, a shaft rotatably carried by bearings coaxially of said interior, annular pole pieces arranged coaxially one at each end of the interior, a generally annular inner flux carrying stator member inside the housing and having end faces substantially parallel to the pole faces but spaced axially therefrom and having a central circular aperture through which the shaft passes, said stator being mounted coaxially about the shaft and serving to carry one or more interconnected pairs of toroidally wound coils which are regularly spaced apart in radial slots around the shaft axis, means for establishing a magnetic field internally between the two pole pieces and through the magnetic circuit formed by the housing and the inner stator member, and two similar disc-like rotor elements axially spaced apart and mounted on the shaft, each being arranged to occupy, except for small clearances, the axial gap between an end face of the stator and a pole face, and each having one or more shaped segments of magnetically conductive material embodies with magnetically nonconductive material, the two similar rotor elements being relatively angularly displaced about the shaft axis so that in the axial direction magnetically conductive material in one rotor is opposite magnetically nonconductive material in the other, and vice versa.

8. An electrical machine as claimed in claim 7, wherein said field means includes coil means for establishing the magnetic field.

9. An electrical machine as claimed in claim 7, in which the inner annular stator member is tapered outwardly, being of larger axial dimensions at its outer circumference.

10. An electrical machine as claimed in claim 7, in which the inner annular stator member is laminated circumferentially.

11. An electrical machine as claimed in claim 7, in which the toroidal coils are of trapezoidal shape in axial planes.

12. An electrical machine as claimed in claim 7, in which each part of the rotor lying in one of the said gaps has at least two portions of high flux conductivity separated angularly by portions of low flux conductivity.

13. An electrical machine as claimed in claim 7, in which a plurality of pairs of toroidal coils are wound on said inner annular stator member so as to provide multiphase output.

14. A synchro transmitter-receiver combination comprising two electrical machines each as claimed in claim 7, and each having field coil windings associated with the magnetic circuit of the respective machine, the field coil windings and the toroidal coils being interconnected electrically so that angular displacement of the rotor of one machine is accompanied by equal angular displacement of the other machine.

References Cited

UNITED STATES PATENTS

| | | | |
|---|---|---|---|
| 2,336,759 | 12/1943 | Stearns | 310—112 X |
| 2,806,159 | 9/1957 | Sheldon | 310—113 |
| 3,141,101 | 7/1964 | Ketay | 310—68 |
| 3,239,702 | 3/1966 | Van de Graaff | 310—168 |
| 3,261,998 | 7/1966 | Bosco et al. | 310—126 |

WARREN E. RAY, Primary Examiner

U.S. Cl. X.R.

310—111, 114, 154, 184, 254, 256, 268